US006469662B2

(12) United States Patent
Tullsson

(10) Patent No.: US 6,469,662 B2
(45) Date of Patent: *Oct. 22, 2002

(54) PROCEDURE FOR THE ELIMINATION OF INTERFERENCE IN A RADAR UNIT OF THE FMCW TYPE

(75) Inventor: Bert-Eric Tullsson, Järfalla (SE)

(73) Assignee: Celsiustech Electronics AB, Jarfalla (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,567

(22) PCT Filed: Oct. 16, 1997

(86) PCT No.: PCT/SE97/01732

§ 371 (c)(1),
(2), (4) Date: May 12, 1999

(87) PCT Pub. No.: WO98/16846

PCT Pub. Date: Apr. 23, 1998

(65) Prior Publication Data

US 2002/0027522 A1 Mar. 7, 2002

(30) Foreign Application Priority Data

Oct. 17, 1996 (SE) .............................................. 9603810
Dec. 20, 1996 (SE) .............................................. 9604774
Dec. 20, 1996 (SE) .............................................. 9604775

(51) Int. Cl.[7] .......................... G01S 13/32; G01S 13/00
(52) U.S. Cl. ........................ 342/195; 342/89; 342/128; 342/159; 342/175; 342/196
(58) Field of Search .......................... 342/89, 98, 120, 342/122, 123, 124, 128–133, 159, 175, 192, 193, 194, 195, 196, 200, 201, 25

(56) References Cited

U.S. PATENT DOCUMENTS

H1720 H * 4/1998 Chen ........................... 342/25

FOREIGN PATENT DOCUMENTS

| EP | 0 557 660 A2 | 9/1993 |
| FR | 2 380 557 | 9/1978 |
| GB | 2 248 359 A | 4/1992 |

OTHER PUBLICATIONS

B. Völcker; On Detection and Suppression of a Chirp Disturbance in a FMCW Radar Signal, *IR–SB–EX–9513*, Sep. 1995; Royal Institute of Technology; Stockholm, Sweden.

(List continued on next page.)

*Primary Examiner*—Bernarr E. Gregory
(74) *Attorney, Agent, or Firm*—Connolly Bove Lodge & Hutz, LLP; Stanley B. Green

(57) ABSTRACT

This invention concerns a procedure for the elimination of interferences, such as pulses and linear chirps, in a radar unit of the FMCW type. According to the procedure, the useable signal in the form of a beat signal, is subjected to time-frequency division of the type STFT for division of the signal into narrow-band frequency bands. Interference is detected and eliminated in each frequency band, after which the time signal freed from interference and its Discrete Fourier Transform, DFT, are calculated from the time-frequency division in narrow-band frequency bands.

17 Claims, 3 Drawing Sheets

OTHER PUBLICATIONS

Proceedings of SPEI, vol. 2027, 1993, (USA), Fargues et al., Application of Time–Frequency and Time–Scale Transforms to Ultra–Wideband Radar Transient Signal Detection, pp. 180–193, see especially pp. 180–181 and pp. 184–185.

Gonzales et al., Digital Image Processing, 1987, Addison–Wesley Publishing Company Inc., (USA), pp. 344–349.

Skolnik, Introduction to Radar Systems, 2nd Ed., McGraw–Hill 1980, Section 3.3.

Mayer, Wavelets, Algorithms & Applications, SIAM, Philadelphia, 1993.

Rioul/Vetterli, Wavelets and Signal Processing, IEEE Signal Processing Magazine, 1991.

Gonzales/Woods, Digital Image Processing, Addison–Wesley Publishing Company Inc., 1992, see pp. 432–439.

Haykin, Adapted Filter Theory, 2nd Ed., Prentice–Hall, 1991, pp. ix and xii.

* cited by examiner

PROCEDURE FOR THE ELIMINATION OF INTERFERENCE IN A RADAR UNIT OF THE FMCW TYPE

BACKGROUND OF THE INVENTION

This invention concerns a procedure for the elimination of interference, such as pulses and linear chirps, in a radar unit of the FMCW type with linear frequency sweep, where the transmitted and received signals are combined to form a useable signal in the form of a difference signal. This difference signal is commonly termed the beat signal, and it includes a wave for each target, where the frequency, amplitude and phase of the wave contain information about the target. The procedure can be used in the field of mobile radar, but it can also be used for other FMCW radar applications.

The principle for linear FMCW radar is well-known, see for example Skolnik, Introduction to Radar Systems, 2nd Ed., McGraw-Hill 1980, chapter 3. Technical advances have resulted in an increased use of FMCW radar units, which will not be considered further here. A linear FMCW (Frequency Modulated Continuous Wave) radar unit, in principle, works as follows:

A frequency sweep controls an oscillator with a variable frequency so that the transmitted frequency varies periodically. Each period has principally three parts, namely a constant base frequency extent, a linear frequency sweep extent and a rapid return to base frequency extent. The linear frequency sweep extent is the time when the radar unit is "carrying out useful work" and often constitutes 70–80% of the total time (work factor 0.7–0.8).

For the sake of simplicity in the discourse below the radar unit and its target are considered stationary. In the case of moving targets or moving radar units the Doppler effect also comes into play. For most actual FMCW systems, however, the Doppler effect only involves a minor correction.

The propagation time from the radar unit to a target and back again is typically a few microseconds. A signal received from a target therefore has the frequency that was transmitted a certain time previously. Since the frequency is swept this is not the same frequency that is being transmitted. The received frequency also has a linear frequency sweep. The received frequency sweep and the transmitted frequency sweep are parallel with a time-displacement equal to the propagation time. Therefore for a fixed target the difference in frequency between the transmitted and received signal will be constant. This constant frequency difference is given by the product of the propagation time to the target and the gradient of the frequency sweep expressed as frequency per unit of time.

Signal processing in a linear FMCW radar unit consists principally of the transmitted and received signals being combined, so that the difference signal (the beat signal) is generated. This signal is the sum of a number of sine waves, where each sine wave represents a radar target. The sine waves have different frequencies, amplitudes and initial phases. Typically a large amplitude corresponds to large target, and a high frequency corresponds to a target at a great distance. The Doppler effect (due to the relative speed) mainly affects the initial phases.

In order to determine what targets are being observed and their sizes and relative speeds, the difference signal is frequency-analysed. The frequency analysis is best carried out digitally. The difference signal is passed through an anti-alias filter and then sampled at a constant sampling rate. Thereafter the sampled signal is multiplied by a window function to reduce the amplitude of the signal at the start and end of the sampling period and the product is sent to a signal processor that carries out a Discrete Fourier Transform, DFT, usually with a fast algorithm, known as an FFT, Fast Fourier Transform. The Fourier Transform is generally complex but for a real time signal (difference signal) it has a certain degree of symmetry. In order to be able to use FFT algorithms the number of samples is usually selected as a power of two (256, 512, 1024 . . . ). 256 samples give 256 FFT coefficients, but if the signal is real the symmetry means that of these 256 values only 128 (actually 129) are independent.

With application of Fourier Transform, for example by FFT, the signal is divided up into a number of discrete frequency components, such as sines. Each frequency corresponds, as indicated, to a distance. The amplitude of a complex FFT coefficient is a measurement of the radar target area (the received power) for the target in the corresponding frequency window (distance window). The FFT performs what is known as a coherent integration of the target signal, which is advantageous. The subsequent signal processing in the system is carried out digitally on the calculated FFT coefficients.

It can be shown that the nominal width of a distance window is inversely proportional to the change in frequency of the linear FMCW sweep during the sampling period. For a distance resolution of 1 m a change in frequency of 150 MHz is required. In order to change the distance resolution, the gradient of the frequency sweep can, for example, be changed while retaining the same sampling time.

The sampling rate limits the frequencies of the beat signal that can be studied and thereby the total observed distance. The width of this "useable band" that lies parallel to the linear FMCW sweep is often less than 1 MHz.

A linear FMCW radar unit can be subjected to interference if it receives signals other than its own transmitted signals reflected from various targets. The radar unit can be subjected to interference from other radar units, including pulse radar units, pulse compression radar units and other FMCW radar units that are operating at the same time.

A pulse present during the sampling period has a very short extent in the time domain and is very broad-band in the frequency domain. A strong interfering pulse only affects a few samples of the beat signal but can affect all the frequencies or frequency bins in the Fourier Transform. The "noise level" in the Fourier Transform appears to be increased, so that small targets can be masked by the interference.

A very common form of interference is what is known as a chirp, where the wave form causing the interference moves with a linear frequency through the useable band of the FMCW radar unit. Such chirps are generated by a pulse compression radar unit, and also by another FMCW radar unit if that unit's transmitted wave form during the base and return extents enters the first unit's useable band during its sampling period. The third extent, the linear frequency sweep, can also generate a chirp if the frequency sweep of the radar unit causing the interference has a different gradient from the frequency sweep of the first radar unit, e.g. because the radar unit causing the interference has a different distance resolution.

Interference in the form of a linear chirp is always broad-band in frequency, but can also have a considerable extent in time and cause interference to the whole FFT and affect a very large part of the sampled time signal.

There are also short chirps that can hardly be distinguished from pulses. The chirps that are caused by the base extent or return- extent of an interfering FMCW radar unit are of this type.

Interference of short duration such as short pulses or rapid chirps can generally be detected and eliminated in the sampled time signal. and an FFT without interference can then in general be reconstructed. A chirp interference with a large extent in both the time domain and in the Fourier domain can, however, not be eliminated by any simple manipulation of the time signal without negative consequences for the FFT.

BRIEF SUMMARY OF THE INVENTION

According to this invention a procedure is proposed for eliminating interference in radar units of the FMCW type that is capable of eliminating interference with a large extent in both the time domain and Fourier domain. The method according to the invention is characterised by (1) the beat signal being subjected to time-frequency division for time-local resolution, (2) by the interference being detected and eliminated separately in each frequency band individually, after which (3) the time signal free of the interference and its Discrete Fourier Transform, DFT, are calculated from the time-frequency resolution.

The sampled beat signal, the time signal, lies completely in the time domain. The samples give a resolution in time but no resolution at all in frequency. The FFT is a description of the same signal in the Fourier domain. The FFT gives a good resolution in frequency, but no resolution at all in time. Interference, e.g. a chirp, present for a short time is poorly visible in the Fourier domain. Information about the position of the interference is to be found mainly in the phases of the complex FFT values and not in the amounts or amplitude.

What is known as a time-frequency resolution makes it possible to have certain (coarse) resolution of the signal in the time domain and in the Fourier domain. A known time-frequency resolution is the Wigner-Ville Transform, which is what is known as a quadratic transform and therefore creates false cross-modulation products, see Mayer, Wavelets, Algorithms & Applications, SIAM, Philadelphia, 1993. Another known time-frequency resolution is what is known as the wavelet transform, see the book by Mayer, or Rioul/Vetterli, Wavelets and Signal Processing, IEEE Signal Processing Magazine, October 1991, that makes a "musical" frequency division. The frequency division is into different scalesor "octaves". For high frequencies the frequency resolution (expressed in Hz) is coarser but the time resolution is finer.

The expressions "time-frequency analysis", "time-frequency decomposition" (cf. the above book by Mayer), "time-frequency distribution" and "time-frequency representation" (cf. the references in the above paper by Rioul/Vetterli) of a signal, leading to a 'time-frequency resolution", are all in common use and mean essentially the same thing: some expressions stress the work done ("analysis"), other the result of the work ("decomposition", "representation", "resolution"), still other the particular methods used ("distribution"). Here the expressions are used as synonyms.

For the application of interference attenuation in FMCW radar units there is proposed, however, mainly the simplest time/frequency resolution, Short Time Fourier Transform, STFT, described in the Rioul/Vetterli reference above. In STFT the time signal is divided into short sections that can overlap. Each section of signal is multiplied by a window function and a Discrete Fourier Transform is calculated. The STFT provides a frequency decomposition for every small part of the time signal and is a time-frequency decomposition. After the elimination of interference in each frequency band individually, the original time signal is calculated from the STFT. The STFT can therefore usefully contain redundant (overlapping) information.

In this connection it is useful to point out that an FMCW radar unit is the only common type of radar unit where a target corresponds to a standing wave with a certain frequency thus fulfilling the conditions for application of normal Fourier analysis with band-pass filter or DFT (FFT).

Detection of interference in each frequency band can advantageously be carried out by methods suitable for the detection of short duration interference.

In one suitable version of the method, the detection of linear chirps and pulses is carried out by methods for detecting straight lines in images, for example so that interference patterns in the form of straight lines not parallel with the time axis are identified, the times where interference lines intersect the different frequency bands of the STFT are determined and the interference is eliminated separately in each affected frequency band. Methods for detecting straight lines in images are known from image processing, see for example Gonzalez/Woods, Digital Image Processing, Addison-Wesley, 1992. A Hough Transform can be used for the detection of the straight lines.

In another suitable version of the method in accordance with the invention, the beat signal is filtered in association with the time-frequency resolution in narrow frequency bands of the signal in order to increase the sensitivity of the detection. The filter can be determined using adaptive methods. In one favorable version, the filter is applied on one or more of the narrow-band frequency bins of the time-frequency resolution.

In yet another suitable version of the method in accordance with the invention, the beat signal or useable signal is reconstructed after the elimination of interference by extrapolation from samples without interference, in one or more of the narrow-band frequency bands of the time-frequency resolution.

STFT-time-frequency resolution for the detection of interference, the elimination of interference and synthesis of the useable signal has many advantages, particularly for chirps. The advantages consist in general of two characteristics. The first is that a chirp in each frequency bin in the STFT is of short duration and can therefore be detected/eliminated by the same methods as, for example, pulses. The second is that chirps are narrow-band in each frequency band in the STFT and can therefore be described (reduced to zero/extrapolated) using simple polynomials of already known structure.

BRIEF DESCRIPTION OF SEVERAL VIEWS OF THE DRAWINGS

The method according to the invention will be described below in greater detail with reference to the enclosed figures, where.

DETAILED DESCRIPTION OF THE INVENTION

Figure 1:
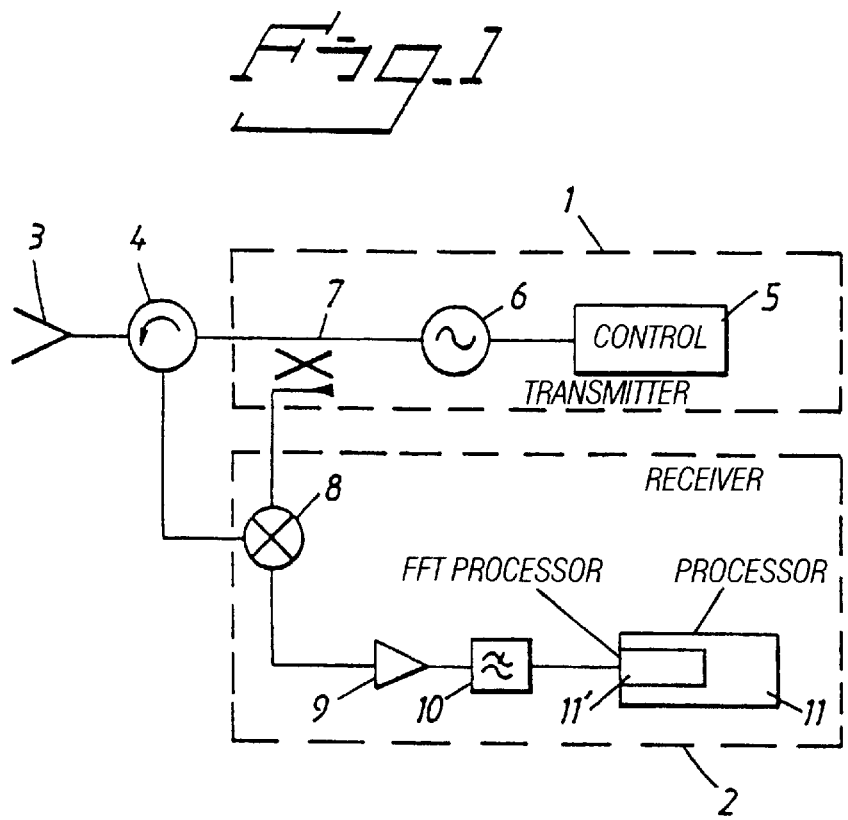
FIG. 1 shows diagrammatically the principle for how a linear FMCW radar unit works and can be modified in accordance with the invention.
Figure 2:
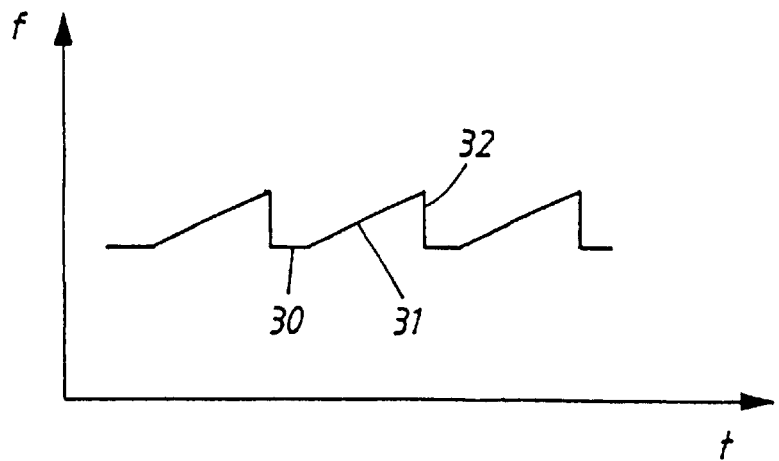
FIG. 2 shows examples of suitable frequency sweeps in a time-frequency diagram.

The radar unit shown in FIG. 1 includes a transmitter 1 and a receiver 2. An antenna 3 is connected to the transmitter and the receiver via a circulator 4. In the transmitter there is an oscillator control device 5 connected to a variable frequency oscillator 6. The frequency sweep from the oscillator control device 5 controls the oscillator 6 so that a signal is generated with periodically varying frequency. The signal is transmitted by the antenna 3 via a directional coupler 7 and the circulator 4. The period of a frequency sweep, see FIG. 2, has principally three parts in the form of a constant base frequency extent 30, a linear frequency sweep extent 31 and a quick return extent 32. The oscillator 6 can work within the Gigahertz range, e.g. 77 GHz. The reflected signal received by the antenna 3 is taken via the circulator 4 to a mixer 8, where the reflected signal is combined with the transmitted signal. After amplification in the amplifier 9 and filtering in the filter 10 a difference signal or beat signal is obtained. The beat signal is used as the basis for the subsequent signal processing, for detecting and eliminating interference and synthesis of the useable signal without interference in a processor block 11 that can also contain what is known as an FFT processor 11'.

An example of how the time-frequency resolution allows the analysis of a difference signal with interference is shown in FIGS. 3–6.

Figure 3:
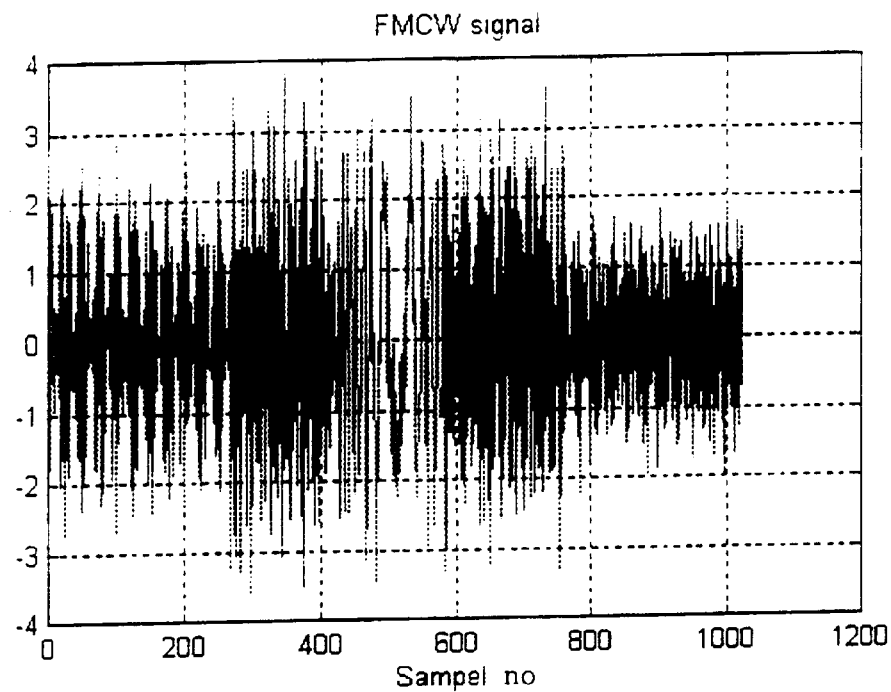
FIG. 3 shows samples of a simulated FMCW beat signal with Gaussian noise and interference.

FIG. 3 shows 1024 samples of an FMCW beat signal (time signal) that is simulated as a number of sine/cosine signals+Gaussian noise+interference. It is difficult by eye to locate and accurately characterise the interference.

Figure 4:
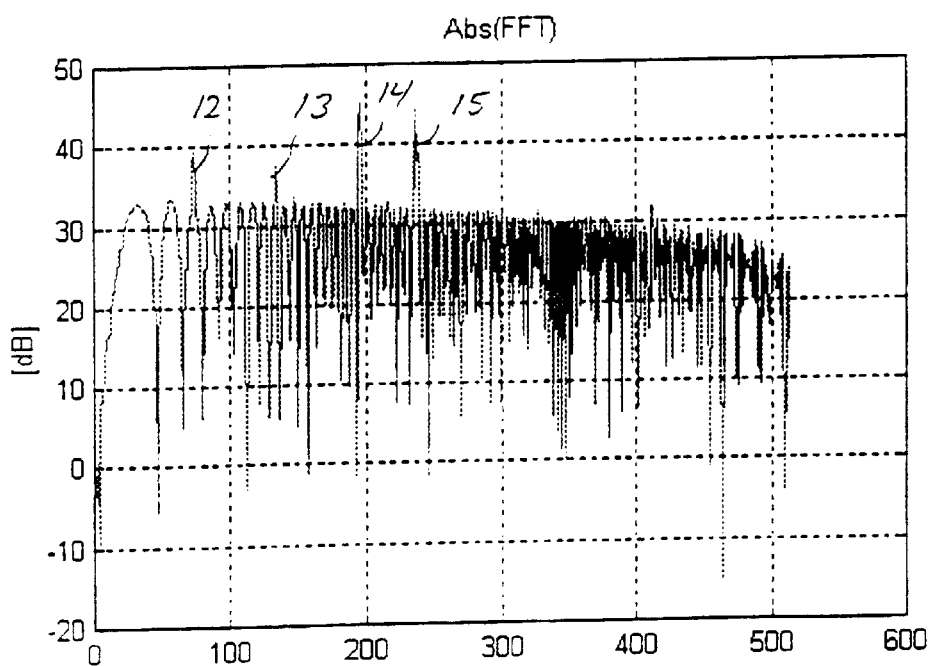
FIG. 4 shows the absolute value of the FFT for the beat signal in FIG. 3.

FIG. 4 shows the absolute value of the FFT for the beat signal in FIG. 3. This illustration reveals four distinct peaks 12, 13, 14 and 15 above a high noise base. Each peak 12–15 corresponds to a target. It is not possible to characterise the interference from FIG. 4.

Figure 5:
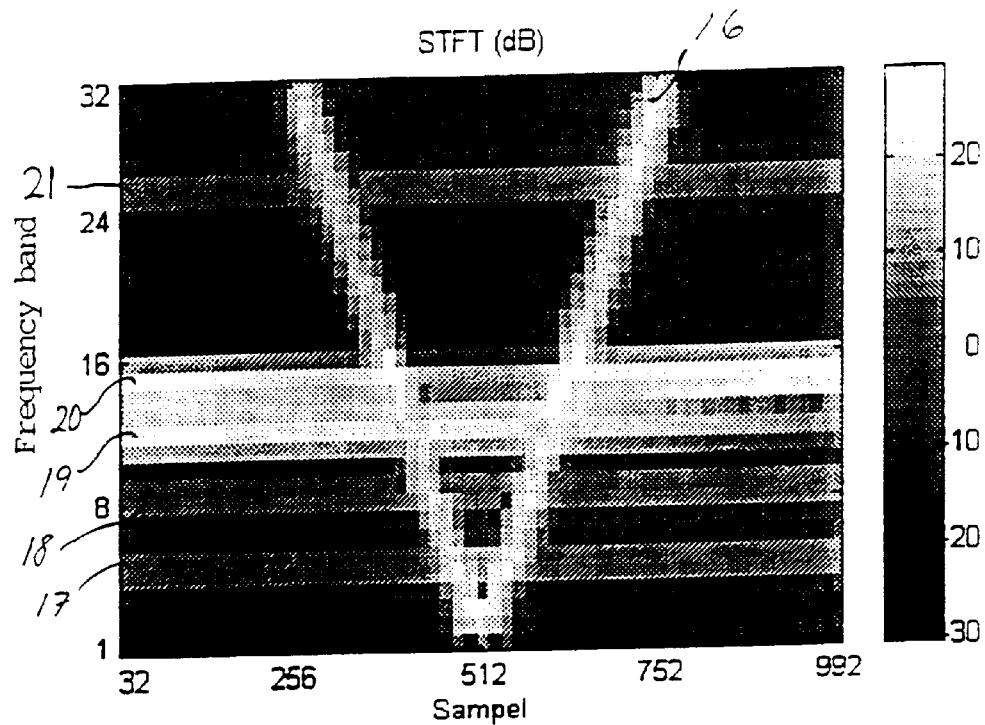
FIG. 5 shows the result of a time-frequency analysis of the beat signal in FIG. 3.

FIG. 5 shows the result of a time-frequency analysis of the beat signal in FIG. 3. FIG. 5 is the result of a STFT performed on batches of 64 samples at a time with overlaps. From FIG. 5 it appears directly from the V 16 that can be seen in the center of the signal that the interference is a linear chirp. The explanation for the chirp being a V and not just a line is that the FFT analysis cannot distinguish between positive and negative frequencies. The dominant peaks in the spectrum appear as horizontal bands 17–21 corresponding to standing sine waves with constant frequency. In FIG. 5 the frequency resolution is quite coarse and the two peaks 14, 15 in FIG. 4 move partly together into a single broad band 19, 20. A horizontal band 21 at approximately 0.8*Nyquist frequency does not correspond to any peak in FIG. 4.

Figure 6:
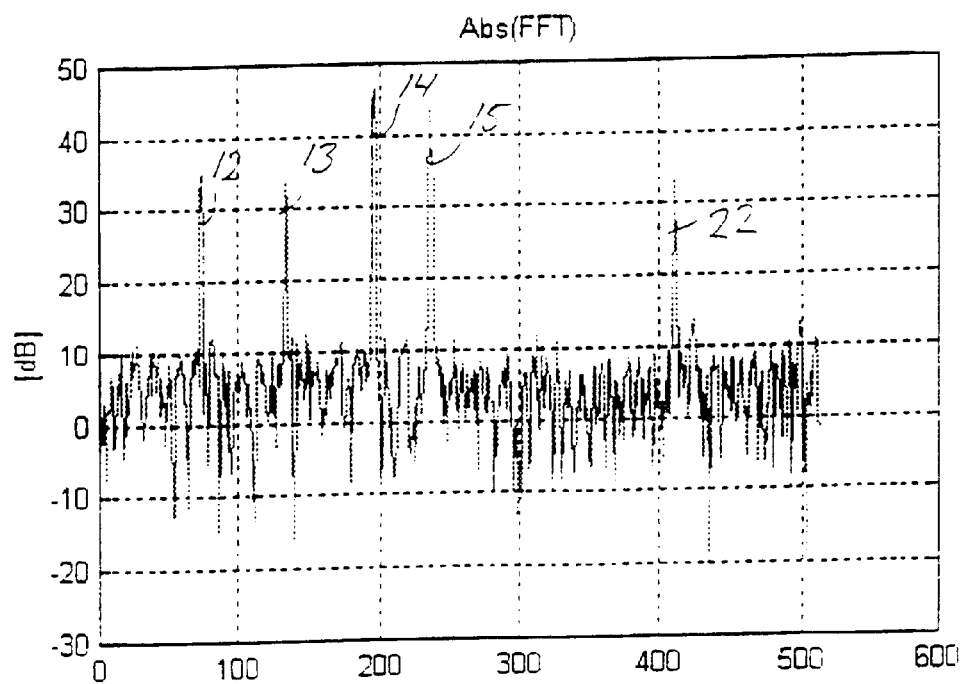
FIG. 6 shows the absolute value of the FFT for a beat signal in FIG. 3 without interference.

By studying the simulated signal without interference and without chirps, shown in FIG. 6 as the absolute value of the FFT, a fifth peak 22 appears associated with the band 21 corresponding to a fifth target. In FIG. 4 this peak is completely submerged by the interference.

One of the great advantages of time-frequency resolution (STFT) for the elimination of interference in FMCW signals can be seen by comparing FIG. 5 and FIG. 3. In FIG. 3 the interference is long. The length of the interference corresponds to the projection of the V on the horizontal time axis in FIG. 5. In each frequency window in FIG. 5 the interference is, on the other hand, relatively short.

By processing each frequency bin individually in an STFT, chirps can be detected and eliminated using the same methods that are used for interferences of short duration pulses. The V 16 in FIG. 5 can be detected and eliminated and the horizontal bands, the useable-signals, can be reconstructed, after which the reconstructed time signal without interference and FFT without interference can be calculated from the STFT. This is the principle behind the method according to the invention.

FIG. 5 shows that a chirp appears as a V, labeled 16, in an STFT analysis. In the same way a pulse appears as a vertical line localized in time but broad-band. The useable signals are, however, horizontal lines. It is therefore possible to detect interference of a pulse or a linear chirp by looking in an STFT image for lines that are not parallel with the time axis. Such methods are known from image processing, see for example the Gonzalez/Woods reference mentioned above. A suitable method in this connection is described in chapter 7 in this reference and is based on what is known as a Hough Transform.

In the following we discuss in greater detail the principles for filtering the useable signal.

The useable signal in an FMCW radar unit, i.e., the signal that corresponds to the actual target, is a sum of sine waves. A signal consisting of a single sine wave, sampled with constant frequency, has a simple linear relationship between samples. Assume that the signal can be written as $\sin(\omega*t+\psi)$. Between two samples the phase angle of the sine wave thus changes by the angle $\omega T=\theta$, where T is the sampling interval. In accordance with the trigonometric identity $$\sin(\alpha+\theta)+\sin(\alpha-\theta)=2*\cos(\theta)*\sin(\alpha)$$

it is then the case for three successive samples of the signal that:

$$x(n+1)+x(n-1)=2*\cos(\theta)*x(n)$$

Note that this is applicable regardless of the amplitude of the signal. This linear relationship can be interpreted in various ways:

a) If the signal is passed through an FIR filter (Finite Impulse Response) with the coefficients $[1-2*\cos(\theta)\ 1]$, the output signal y from the filter will be identical to 0:

$$y(n)=x(n)-2*\cos(\theta)*x(n-1)+x(n-2)$$

It is possible therefore to strongly attenuate the signal with a single FIR filter with constant coefficients.

b) If the relationship is instead written:

$$x(n+1)=2*\cos(\theta)*x(n)-x(n-1)$$

it can be seen that the next sample can be predicted by a linear combination of the immediately preceding samples.

For a signal that consists of several sine waves with distinct frequencies corresponding filters can be created by multiplication of second order FIR filters. A signal that is the sum of four different sine waves, i.e. an FMCW signal with four strong targets, can thus be reduced to zero by an FIR filter of order 8 and a sample can be predicted linearly from the 8 preceding ones.

For a general FMCW signal these relationships are approximate, but the following can be said in general to apply:

1. It is possible to strongly attenuate an FMCW signal by means of a suitable linear FIR filter of a suitable order.
2. It is possible to predict linearly an FMCW signal using a suitable linear relationship of a suitable order.

The application of point 1 is that the sensitivity of the detection of interference is greatly increased if the useable signal is pre-filtered in a suitable way. In FIG. 5 this corresponds to the horizontal bands being filtered away. Only the interference then remains against a weak background. This permits the detection of interference with an amplitude that is much lower than that of the useable signal, e.g. a signal that is completely invisible by analysis of the amplitudes in FIG. 3 but that still increases the noise base in the FFT in FIG. 6.

Point 2 makes it possible to interpolate the useable signal past a short section with interference, which will be described in greater detail later on.

A "suitable" filter can be calculated in various ways, or calculated as an adaptive filter. Both problems according to point 1 and point 2 above are known from adaptive signal processing, see for example Haykin, Adaptive Filter Thoery, $2^{nd}$ Ed., Prentice-Hall 1991. The coefficients can be determined by the usual algorithms, e.g. LMS, normalized LMS, RLS, etc, see in particular chapters 9 and 13 in the above reference.

By adaptive determination of a filter it is often possible to use the fact that the radar antenna has turned, although only a fraction of a beam width, since the previous FMCW frequency sweep. The dominant sine waves in the signals from two subsequent FMCW sweeps have, as a result, almost the same frequency and almost the same amplitude. The start values of the adaptation can therefore be selected as the end values from the adaptation during the previous FMCW sweep.

It is also an important observation that in each frequency band in a STFT division of the signal the filters are very simple. In each frequency band the signal is narrow-band and the middle frequency of the window is known. This means that the phase shift between two successive samples is known and just a second order filter has a very good effect.

In the following the synthesizing of the useable signal is discussed.

A usual method of attenuating interference is to detect interference, e.g. a pulse, by the signal amplitude being unusually large and then to carry out clipping of the signal, preferably to the level 0. This can in itself eliminate the interference, but adversely affects the FFT by also affecting the useable signal.

The precondition for an FFT is that the sample is sampled equidistantly over a suitable period. Clipping of the signal removes samples. It can be said that the time base of the useable signal is affected. A consequence is that distinct targets are widened in the Fourier domain, which among other things can result in a reduction in the resolution.

A very useful method is to follow up the interference elimination by a synthesis of the useable signal. Here point 2 above can be used. The synthesis can consist of an extrapolation (one-ended) or interpolation (two-ended) of the signal based on values without interference. Such a synthesis can result in a dramatic improvement in the reconstruction of the FMCW signal without interference and its FFT.

The polynomial of the interpolation/extrapolation can as mentioned above be determined adaptively or in another way. The interpolation is particularly simple if the signal is narrow-band, as an interpolation polynomial of low order is usually sufficient.

The interpolation/extrapolation is numerically sensitive, among other things on account of the fact that the roots of the polynomial of the extrapolation lie on or near the unit circle and numerical interference therefore does not die out, and can also for other reasons only be carried out over short sections of time. It is therefore not possible simply to interpolate/extrapolate past a chirp of a certain length.

This problem can be solved by carrying out an STFT on the signal with interference in accordance with this invention. In each frequency window there will then be a chirp of only a short duration. In addition the signal components in each frequency window are narrow-band, which in accordance with the above makes the interpolation/extrapolation much simpler.

What is claimed is:

1. A method for the elimination of interference in a FMCW radar unit wherein transmitted and received signals are combined to form a difference signal; said method comprising the steps (a) performing a time-frequency resolution of the difference signal to form individual frequency bands of said difference signal;

(b) detecting and eliminating interference separately in each of said frequency bands to form interference-free frequency bands; and (c) constructing an interference-free time signal from said interference-free frequency bands.

2. The method of claim 1 which includes the further step of:

(d) calculating a Discrete Fourier Transform (DFT) from said interference-free time signal.

3. The method of claim 2 wherein said time-frequency resolution is a Short Time Fourier Transform (STFT) and wherein said DFT is a Fast Fourier Transform (FFT).

4. The method of claim 1 wherein said time-frequency resolution is a Short Time Fourier Transform (STFT).

5. The method of claim 1, wherein said interference comprises chirps and pulses, and said interference detecting employs procedures to detect straight lines in images.

6. The method of claim 5, wherein the straight lines which are detected are lines which are not parallel with a time axis, and the method further comprises eliminating interference corresponding to the detected lines in each of plural frequency bands.

7. The method of claim 5 which includes applying a Hough transform for straight-line detection.

8. The method of claim 7 which includes the further step of:

(d) calculating a Discrete Fourier Transform (DFT) from said interference-free time signal.

9. The method of claim 8 wherein said time-frequency resolution is a Short Time Fourier Transform (STFT) and wherein said DFT is a Fast Fourier Transform (FFT).

10. The method of claim 9, wherein said step (b) further comprises pre-filtering frequency bands corresponding to said difference signal, to increase the sensitivity of detection.

11. The method of claim 10, wherein said step (b) further comprises calculating an adaptive filter for performing said pre-filtering.

12. The method of claim 11, wherein said filter is applied to at least one frequency window of a frequency band formed by said time-frequency resolution.

13. The method of claim 12, wherein said step (c) comprises extrapolating from interference-free samples.

14. The method of claim 1, wherein said step (b) further comprises pre-filtering frequency bands corresponding to said difference signal, to increase the sensitivity of detection.

15. The method of claim 14, wherein said step (b) further comprises calculating an adaptive filter for performing said pre-filtering.

16. The method of claim 15, wherein said filter is applied to at least one frequency window of a frequency band formed by said time-frequency resolution.

17. The method of claim 1, wherein said step (c) comprises extrapolating from interference-free samples.

* * * * *